(12) United States Patent
Morcos et al.

(10) Patent No.: US 6,229,539 B1
(45) Date of Patent: *May 8, 2001

(54) METHOD FOR MERGING ITEMS OF CONTAINERS OF SEPARATE PROGRAM MODULES

(75) Inventors: Peter G. Morcos, Redmond; Lawrence W. Baldwin, Seattle; David C. Parker, Woodinville, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,269

(22) Filed: Dec. 23, 1998

Related U.S. Application Data

(62) Division of application No. 08/891,945, filed on Jul. 14, 1997.

(51) Int. Cl.⁷ .................................................. G06F 9/00
(52) U.S. Cl. ................................ 345/352; 345/347
(58) Field of Search .................................. 345/333, 334, 345/335, 339, 356, 340, 352, 347

(56) References Cited

U.S. PATENT DOCUMENTS

| | | | |
|---|---|---|---|
| 4,931,783 | 6/1990 | Atkinson . | |
| 5,546,522 | * 8/1996 | Nishida et al. | 345/335 |
| 5,625,763 | * 4/1997 | Cirne | 345/333 |
| 5,625,783 | * 4/1997 | Ezekiel et al. | 345/352 |
| 5,644,738 | 7/1997 | Goldman et al. . | |
| 5,689,666 | * 11/1997 | Berquist et al. | 345/345 |
| 5,760,768 | 6/1998 | Gram . | |
| 5,801,701 | 9/1998 | Koppolu . | |
| 5,828,376 | 10/1998 | Solimene . | |
| 5,838,317 | * 11/1998 | Bolnick et al. | 345/339 |
| 5,917,483 | * 6/1999 | Duncan et al. | 345/333 |

OTHER PUBLICATIONS

*Microsoft Word: The World's Most Popular Word Processor, Version 6.0 User's Guide*, Microsoft Corporation, 1993–1994, pp. xi, 737–758.
Brockschmidt, Kraig, *Inside OLE 2: The Fast Track to Building Powerful Object–Oriented Applications*, Microsoft Press, 1994, pp. v–xiv, 843–905, 969.

* cited by examiner

*Primary Examiner*—Raymond J. Bayerl
*Assistant Examiner*—Cao H. Nguyen
(74) *Attorney, Agent, or Firm*—Kilpatrick Stockton LLP

(57) ABSTRACT

Merging a first set of items from a first container in a first program module and a second set of items from a second container in a second program module. An inquiry is conducted to decide which of the first set of items and the second set of items are eligible to be donated. Eligible items are combined by combining the eligible items of the first set of items with the eligible items from the second set of items. A merged container contains at least one item of the first set of items and at least one item from the second set of items. This merged container can be displayed to present the items included within that container. The containers typically comprise command bars and the items typically comprise controls.

6 Claims, 8 Drawing Sheets

|  | | | | | | | | | | | |
|---|---|---|---|---|---|---|---|---|---|---|---|
| Container | U | V | W | X | Y | Z | N | | | | |
| Object (server) | J | K | Y | L | X | Z | | | | | |
| 1000 → | J | K | Y | L | X | Z | N | | | | |
| 1005 → | U | J | K | Y | M | L | X | N | | | |
| 1010 → | U | V | J | K | L | Y | M | N | X | | |
| 1015 → | U | V | J | K | Y | L | M | N | X | X | |
| 1020 → | U | V | J | K | Y | L | M | N | X | X | M | N |
| 1025 → | U | V | J | K | Y | Z | L | M | X | N | | |

METHOD FOR MERGING ITEMS OF CONTAINERS OF SEPARATE PROGRAM MODULES

RELATED APPLICATIONS

The present application is a divisional of non-provisional patent application entitled "Improved Method for Displaying Controls in a System Using a Graphical User Interface", filed on Jul. 14, 1997 and assigned U.S. application Ser. No. 08/891,945 pending.

TECHNICAL FIELD

The present invention relates to the display and manipulation of command-related items in a graphical operating system, and more particularly relates to an improved method for displaying and manipulating various controls in a system that uses a graphical user interface.

BACKGROUND OF THE INVENTION

Most modern computer software employs a graphical user interface (GUI) to convey information to and receive commands from users. A graphical user interface relies on a variety of GUI objects or controls, including icons, text, drop down menus, toolbars, dialog boxes, buttons, and the like. A user typically interacts with a graphical user interface by using a pointing device (e.g., a mouse) to position a pointer or cursor over an object and "clicking" on the object. An example of an operating system that employs a graphical user interface is the "WINDOWS 95" operating system, which is manufactured and sold by Microsoft Corporation of Redmond, Washington.

In a program module (e.g., an operating system or application program) that employs a graphical user interface, commands are typically represented by controls that are displayed in drop down menus and toolbars. Drop down menus, which may also be referred to as popup menus or menu popups, are used to organize numerous controls under major headings, which are displayed in a menu bar that appears along the top of a window. Each heading is a "menu control" that represents a drop down menu. A menu drops down when the user selects the associated menu control in the menu bar, thereby allowing access to the controls that are included in the drop down menu. A user may select or invoke a command by clicking on the menu control, dragging the pointer down to the control associated with the desired command, and releasing the mouse button. Alternatively, the user may click on the menu control and release the mouse, then click and release on the appropriate control in the drop down menu. The primary advantage of drop down menus is that they can be used to contain and organize a large number of controls, but take up very little screen space when not in use. In addition, menus can also be operated using the keyboard when a pointing device is unavailable or unusable.

Toolbars usually include buttons, which are arranged in one or more rows or columns. Each button is associated with a command, and is identified by an icon that represents or depicts that command. For example, the "print" command may be invoked by clicking on a button whose icon depicts a printer. Significantly, a user can invoke commands on the toolbar by clicking once on the associated button. In addition to buttons, toolbars can also include other interactive controls, such as text boxes, combo boxes, etc. Some toolbars can be turned on or off, and can be oriented horizontally or vertically. Although most toolbars are visually attached to a window, some may float above a window.

The primary advantage of toolbars is that they present a set of buttons or controls that are only one click away while the user is using the associated program. A corresponding disadvantage of toolbars is that exposing a large number of commands requires displaying a large number of controls, which require a relatively large amount of screen space. Another disadvantage is that conventional toolbars require the use of a pointing device and may not be operated using a keyboard.

Although toolbars and drop down menus both provide ways to display controls (many of which are associated with the same command), they look and feel very different. In drop down menus, commands are usually represented by simple menu items, such as text without icons. In toolbars, commands are often represented by icons without text. This difference presents a disadvantage for users (especially new users) because there are no common visual cues to alert a user to the connection or linkage between identical commands that appear in a drop down menu and on a toolbar.

As application programs have incorporated ever increasing numbers of commands, drop down menus have become full and software developers have relied more heavily on toolbars as the primary means for exposing some of the commands to the user. Unfortunately, a command that is only available on a toolbar may be somewhat obscure and, in many cases, not easily discovered or understood by the user because the command is represented by only a small icon.

In some programs, a user may customize the drop down menus and toolbars. This allows a user to add controls (which represent commands) to or delete controls from menus and toolbars. In the prior art, drop down menus and toolbars are customized using different processes. Some toolbars may be customized using a drag and drop process to drag controls from a list of available commands to a toolbar. Drop down menus typically require the use of dialog boxes and other techniques to add or delete controls. In addition, although some commands may be represented on menus or in toolbars or both, other commands are restricted to one or the other. This difference results in several drawbacks. First, limiting some commands to drop down menus and others to toolbars restricts the user's ability to efficiently and conveniently group commands. Second, treating drop down menus and toolbars differently requires the program to maintain different lists of available commands for menus and toolbars. This results in duplication and larger program code, which requires more memory to store and more time to load.

In the prior art, toolbars have contained a variety of rich, interactive controls, such as buttons, combo boxes, text boxes, etc. However, drop down menus have been restricted to representing commands with simple menu items, such as a text string. Therefore, if an application was to provide one of these rich controls, it had to use a toolbar to do so.

Another feature associated with drop down menus and toolbars has to do with OLE menu merging, which occurs when one application displays an embedded object in another application's document. For example, a Microsoft Excel spreadsheet (the object) may be embedded and displayed in a Microsoft Word document (the container). When the embedded object is activated, it may be edited. In order to facilitate this process, Microsoft's Object Linking and Embedding (OLE) interface merges the menus from the spreadsheet and word processing programs, thereby providing relevant commands to the user. However, in the prior art, menu merging required an application to contribute its entire menu. In addition, toolbars were not merged, which resulted in only those toolbars provided by the embedded object being displayed and the controls representing client-type functions (e.g., print) being disabled. This results in several drawbacks. First, some useful commands may be not be available while the embedded object is activated. In addition, some of the available commands may not be useful or intuitive.

In another aspect, prior art menus have provided tear off menus, which may be torn off by moving the mouse cursor past the edges of the displayed menu. However, the prior art method did not include any visual cue that a menu could be torn off, and was therefore not easily discoverable. In addition, these menus are prone to being torn off accidentally if the user tries to close the window by the common practice of moving the cursor beyond the window border and releasing the mouse button.

In summary, prior art drop down menus and toolbars provide a good way to display controls and expose commands. However, there are several disadvantages that flow from the fact that drop down menus and toolbars are treated differently, and may include different controls. Furthermore, menu merging has been limited to menus, and requiring an application to contribute an entire menu has resulted in the unavailability of some useful commands.

Therefore, there is a need in the art for an improved command bar that overcomes these drawbacks. An improved command bar would allow all controls to be included in either menu-type containers or toolbar-type containers and would include visual cues that indicate the linkage between similar commands. In addition, an improved command bar would allow the user to have greater control over what commands can be put where, thereby allowing commonly used controls to be placed in a toolbar-type container and less commonly used controls to be placed in a menu-type container. This would allow rich, interactive controls to be placed in a menu popup, and would increase efficiency of use and of screen space. An improved command bar would eliminate the use of different customization procedures and would be operable from the keyboard regardless of whether it is a menu-type container or a toolbar-type container. With respect to menu and toolbar merging, an improved command bar would allow each application to contribute individual commands to both menu-type containers and toolbar-type containers, and would arrange them in a user-friendly and intuitive manner. This would ensure that both container and object-related buttons come from the appropriate source and operate properly when selected. Finally, an improved command bar would provide an improved method for tearing off tearable menus. This method would provide visual cues that the menu can be separated from the menu or toolbar and would prevent the menu from being torn off accidentally.

SUMMARY OF THE INVENTION

The present invention satisfies the above-described needs by providing an improved method for displaying controls in a system using a graphical user interface. Controls are displayed in command bars, which may be displayed as both menu-like containers and toolbar-like containers. Controls may be included and arranged in either type of command bar container, regardless of whether they are simple menu items or interactive controls. When an application embeds an object in another application, each application contributes individual commands to the merged menu-type containers and toolbar-type containers, and arranges then in a useful, intuitive order.

Generally described, the present invention provides a method for providing command bars. The method includes the steps of displaying a toolbar-like command bar that includes at least one menu control. Upon receiving an indication that the menu control has been selected, a menu-like command bar is displayed. The menu-like command bar includes at least one interactive control.

In another aspect, the present invention provides a data structure for providing controls in a command bar. A computer-readable medium includes a plurality of data fields stored on the medium and representing a data structure. The data fields include first, second, and third data fields. The first data field including data identifying a command bar. The second data field contains data representing a plurality of controls included in the command bar, where the controls are chosen from a group including simple menu items and interactive controls. The third data field contains data representing the display state of the command bar. The display state may include data representing a menu-like display state or a toolbar-like display state. When the command bar is a toolbar-like command bar, the control may includes at least one popup menu control. When the command bar is a menu-like command bar, the controls may include a simple menu item and at least one interactive control.

In another aspect, the present invention provides a method for implementing command bars in an application program module. The method is implemented in a computer system including a shared program module that includes functions for manipulating the command bars and shared memory for storing data associated with the command bars. The method includes, in the application program module, calling the functions in order to display a menu-like command bar including an interactive control. In response to an input signal, the application program module receives from the shared program module an indication of the selection of the interactive control. In response to the indication, the application program module determines a function associated with the control and performs the function.

In another aspect, the present invention provides a method for customizing a command bar that includes a menu control. The method includes displaying a first command bar including a menu control and displaying a container including an available control. The method includes receiving from an input device an indication that the available control has been moved to the menu control. In response to the available control being moved to the menu control, a menu popup associated with the menu control is displayed. The method includes receiving from the input device an indication that the available control has been moved to a position in the menu popup. In response, the available control is displayed in the position in the menu popup.

In yet another aspect, the present invention provides a method for merging a first set of items from a first container in a first program module and a second set of items from a second container in a second program module. The method includes determining which of the first set of items are eligible to be donated and which of the second set of items are eligible to be donated. The eligible items from the first set of items are combined with the eligible items from the second set of items. A merged command bar, including at least one item from the first set of items and at least one item from the second set of items, is displayed.

In yet another aspect, the present invention provides a method for removing a menu popup from a command bar. The method includes displaying a command bar and displaying. a menu popup including a drag handle. The menu popup is connected to the command bar. The method includes receiving from the input device an indication that the drag handle has been dragged away from the command bar. The menu popup is moved away from the command bar in response to the indication. In response to an indication that the menu popup has been dropped, the menu popup is displayed in a position corresponding to the drop indication. In this manner, the menu popup is removed from the command bar.

Alternatively, a menu popup may be removed from a command bar by displaying a command bar and displaying an original menu popup including a drag handle. The original menu popup is connected to the command bar. In response to an indication that the drag handle has been selected, the removed menu popup is displayed in a default position separate from the command bar.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 10 is a example of how command bar elements may be merged.

DETAILED DESCRIPTION

Figure 1:
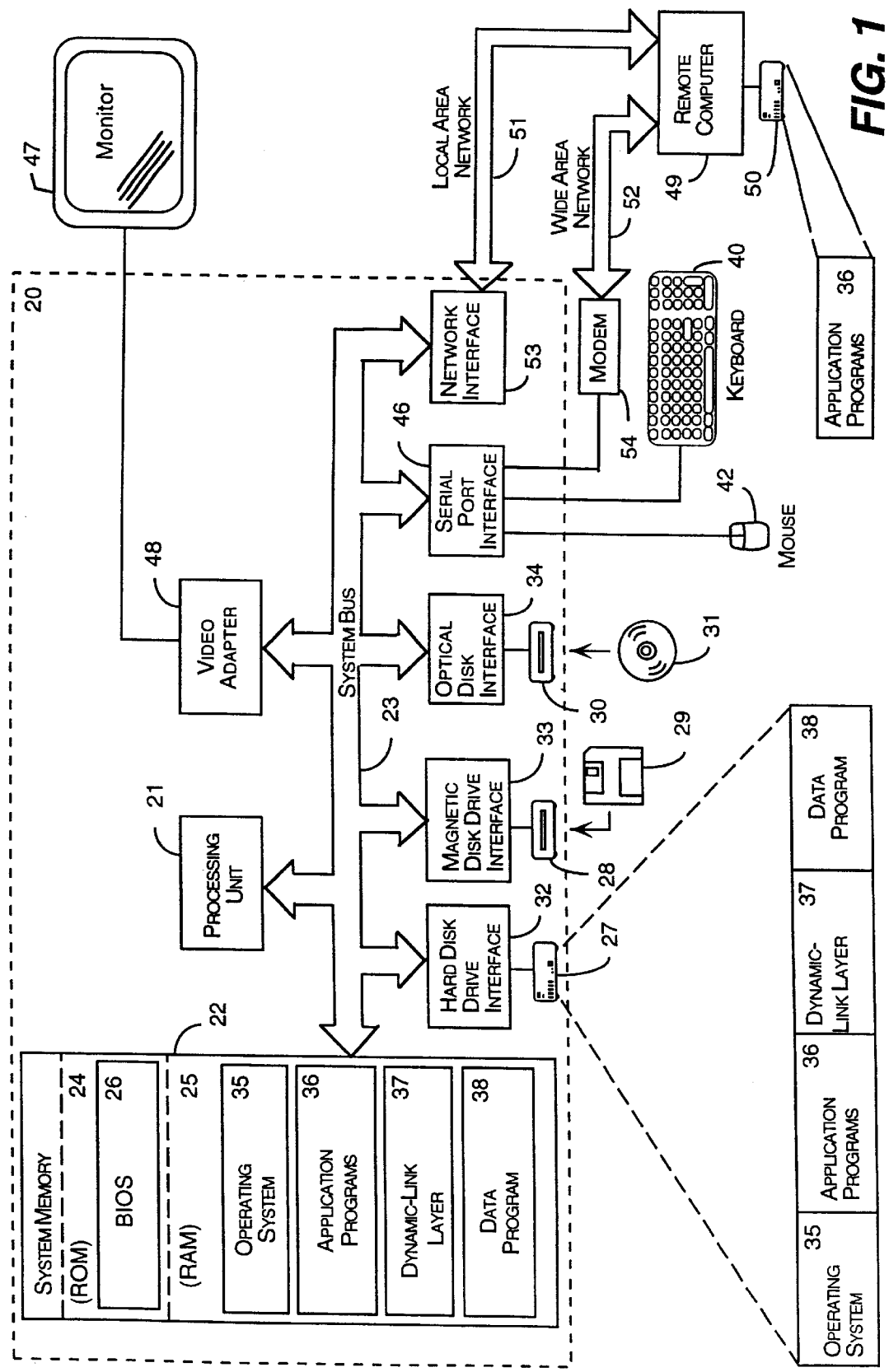
FIG. 1 is a block diagram of a personal computer that provides the operating environment for an embodiment of the present invention.

The present invention is directed to an improved method for displaying various controls in command bars, which may be displayed as both popup menu-like containers and toolbar-like containers. The controls, which are associated with a single list of available commands, may be included and arranged in either type of command bar container, regardless of whether the controls are popup menu controls or pushbutton controls (e.g., text, buttons, or other rich controls). When an application embeds an object in another application, each application contributes individual commands to the merged command bars and arranges then in a useful, intuitive order. In addition, some popup controls can be torn off to create separate, floating command bars. The tearable popup controls include visual clues that the menu can be torn off.

Referring now to the drawings, in which like numerals represent like elements throughout the several figures, aspects of the present invention and an exemplary operating environment will be described.

EXEMPLARY OPERATING ENVIRONMENT

FIG. 1 and the following discussion are intended to provide a brief, general description of a suitable- computing environment in which the invention may be implemented. While the invention will be described in the general context of an application program that runs under an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 (e.g., Microsoft Corporation's "WINDOWS 95" operating system), one or more application programs 36, a shared dynamic-link library 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

A METHOD FOR DISPLAYING CONTROLS IN A COMMAND BAR

An exemplary method for displaying controls in a command bar is illustrated in FIGS. 2, 3, and 5—7. In this embodiment, the present invention displays controls in multiple command bars, which are containers for controls. Command bars replace conventional menu bars and toolbars. Command bars can include a variety of controls, including simple menu items and interactive controls. Simple menu items refer to textual command names that simply invoke a single command when activated. An example of simple menu items includes the static text that typically appears in conventional drop down menus. Interactive controls include edit or text boxes, combo boxes, list boxes, buttons, expanding grids, static text, menu controls, color pickers, etc., which typically appear in conventional toolbars. Some interactive controls allow a user to perform complex, multi-step actions, such as typing text.

In an exemplary embodiment, command bars may be displayed in either of two forms. Toolbar-like command bars resemble conventional docked or floating toolbars, which typically include interactive controls of the type described above. Menu-like command bars resemble conventional drop down menus, which typically include simple menu items, such as text controls. In this embodiment, the toolbar-like command bars may also resemble conventional menu bars, which include popup menu controls.

An important advantage of command bars is that although they may be displayed in different forms, they are identical with respect to their underlying data structure, and are treated identically by the underlying command bar program module. This allows command bars, regardless of their displayed form, to be implemented and controlled by the same underlying code, and to employ the same catalog of commands, icons, text strings, etc. This provides an interface that is more versatile than when using separate menu bars and toolbars, and allows the underlying code to be simpler and more compact. The unified data structure also results in additional advantages, such as a unified customization procedure and improved command merging. These features are discussed below.

Figure 2:
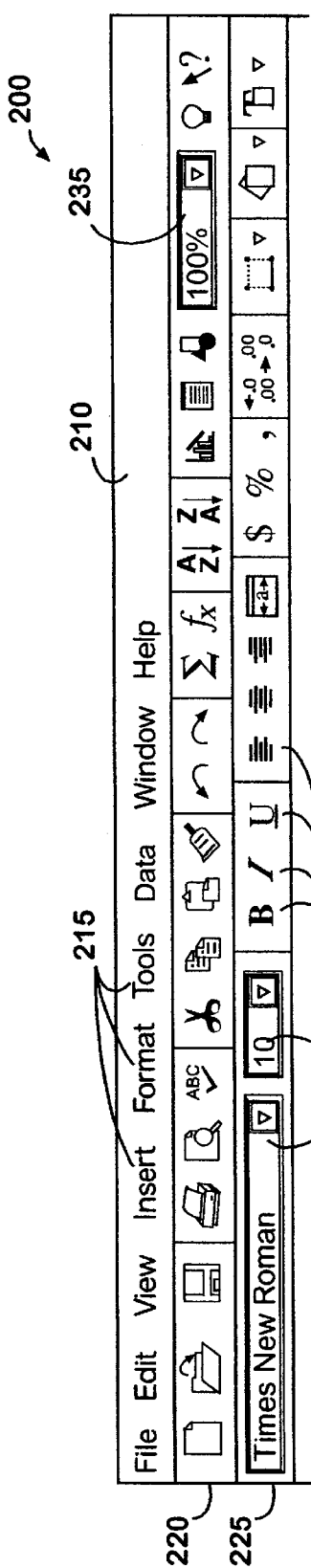
FIG. 2 illustrates a group of command bars that look like a conventional menu bar and conventional toolbars.

FIG. 2 illustrates a group of command bars that look like a conventional menu bar and conventional toolbars and would be displayed at the top of an application window. The illustrated command bar structure 200 includes three toolbar-like command bars. The toolbar-like command bar 210 which resembles a conventional menu bar and includes a group of popup menu controls 215. The toolbar-like command bars 220, 225 resemble conventional toolbars and include buttons 230 and combo boxes 235.

Figure 3:
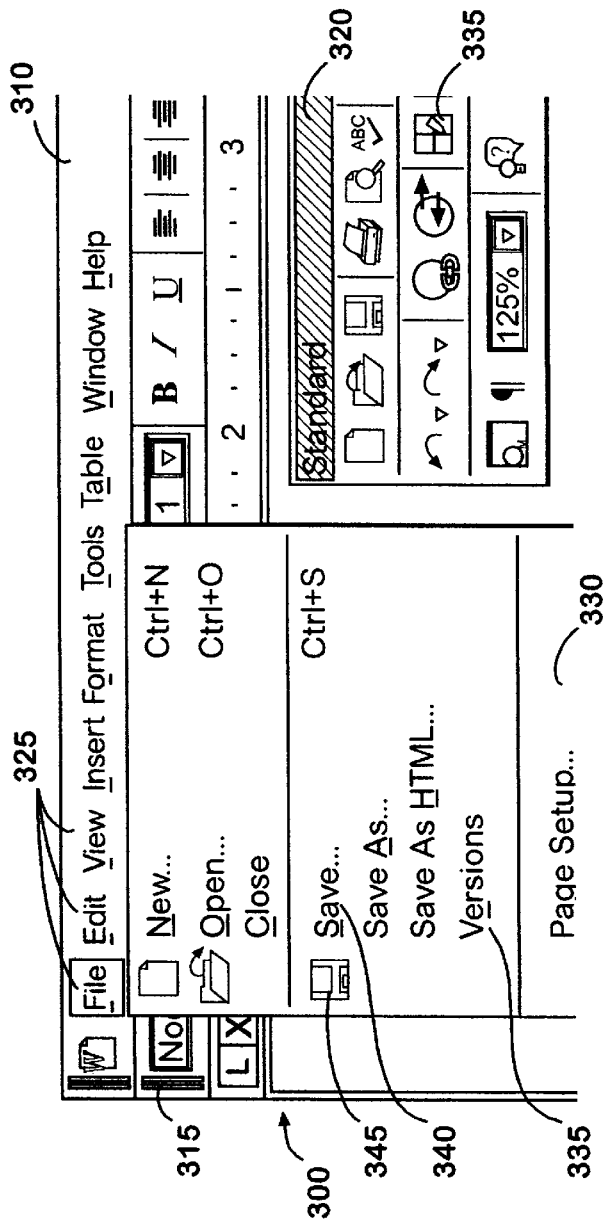
FIG. 3 illustrates various aspects of command bars, including a menu popup and a floating command bar.

FIG. 3 depicts the upper, left portion of a document window 300, and illustrates various features of command bars. In this embodiment, the command bar structure includes a toolbar-like command bar 310, which resembles a conventional menu bar, an attached toolbar-like command bar 315, and a floating toolbar-like command bar 320.

For the purposes of this description, the following terminology will be used to describe the features of the command bars. The toolbar-like command bar 310 includes a plurality of menu controls 325. When a menu control is activated by a user (typically by selecting, or clicking on, the menu control), an associated menu popup 330 is displayed. The menu popup 330 is a menu-like command bar, and may also be referred to as a popup bar or command bar popup. In general, a menu popup is a transient command bar that is displayed only long enough for a single command to be chosen by the user. In contrast, top level command bars, such as command bars 310, 315, 320, are displayed until they are explicitly dismissed. The illustrated menu popup 330 and toolbar-like command bars 315, 320 include push button controls 335, which are selected the same as conventional toolbar buttons and menu items. The term "highlighted control" is used to refer to a control that has been highlighted as the user is in the act of choosing a control.

One significant advantage of command bars over conventional menu bars and toolbars is that in the menu popup 330, a command can be represented by both a text string 340 and an icon 345. Because the icon in the menu popup is the same icon that is used to represent the command in a toolbar-like command bar, command bars are able to provide useful visual cues that allow a user to associate commands in menu popups with shortcut commands in toolbar-like command bars. For example, the "SAVE" command is represented by the same icon in the menu popup 330 and the floating command bar 320. This allows users to determine the most efficient way to access a particular command if it is available in more than one command bar.

In an exemplary embodiment, the program module that implements the command bar code is stored in the form of a dynamic-link library, which is included with Microsoft Corporation's "OFFICE 97" suite of application programs. Generally described, in the "WINDOWS" family of operating systems, a dynamic-link library (DLL) is a mechanism for code sharing between program modules. The feature allows executable routines to be stored separately as files with DLL extensions, and for multiple applications to run the same code. These DLL files typically serve a specific function or set of functions and are loaded by a calling program only when needed by that program. A dynamic-link library has several advantages. For example, because a dynamic-link library is loaded only when it is needed, it does not consume any memory until it is used. In addition, because a dynamic-link library is a separate file, a programmer can make corrections or improvements to only that module without affecting the operation of the calling program or any other dynamic-link library. Finally, because a dynamic-link library often contains related functions, a programmer can use the same dynamic-link library with multiple programs.

Figure 4:
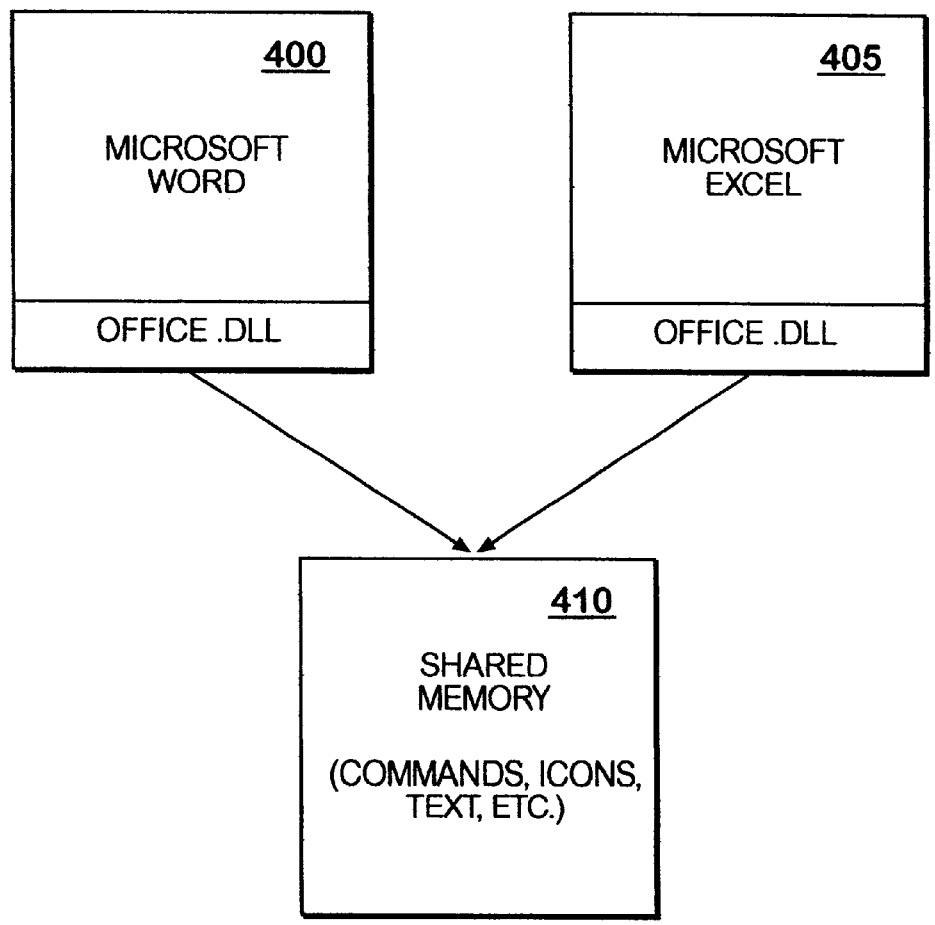
FIG. 4 illustrates the use of a dynamic-link library to implement the command bar code.

With this background, FIG. 4 illustrates how a dynamic-link library is used to implement the command bar functionality in one or more application programs. In the illustration of FIG. 4, a dynamic-link library is used to implement the command bar code. Two application programs 400, 405 each load an instance of the command bar dynamic-link library, which is also referred to herein as the Office shared code. Each application calls functions in the dynamic-link library when it needs to perform a command bar related task. In addition, the Office shared code manages a block of memory 410 that is used to store a variety of command bar-related data. If multiple applications are simultaneously running Office shared code, the copies cooperate with each other in the management of the shared block of memory. Similarly, during menu merging, which is discussed below, the application programs' instances of the dynamic-link library code negotiate with each other to figure out how the command bars should be merged.

As mentioned above, the block of memory 410 is used to store command bar-related parameters and data. The stored data include, for example, the set of available commands, a unique numeric ID for each command, the bit maps and default text strings that are associated with each command, and the default settings for command merging. Other types of information, such as the state of each command bar, are different for each program and are stored in the program's memory.

The role of the command bar dynamic-link library includes controlling the display of and interaction with the command bars. This includes a variety of command bar-related functions, such as showing, hiding, resizing, moving, docking, and undocking the command bars. The command bar dynamic-link library also handles mouse and keyboard interaction with the individual controls. It will be appreciated that a different set of command bars can be available for each document, and that some command bar-related options are available to all command bar-enabled application programs.

As an illustration of the interaction between an application program and the dynamic-link library, consider an example in which the "MICROSOFR WORD" application program 400 employs the functions of the Office shared code. If the user interacts with the document portion of a window, the application program handles the interaction and response by performing the appropriate task. If the user interacts (e.g., clicks) on a control in the command bar, the input is handled by the Office shared code. At that point, the dynamic-link library code determines which button was selected, how the selected button should be displayed, etc. If necessary, the dynamic-link library code calls the application program and indicates that a specific button (e.g., button 1234) was selected. When this occurs, the application determines the command associated with button 1234 and performs the command.

Each command bar control is associated with an ID, and an icon, or text string, or both. In general, each control has a unique identifier that is used to identify it. Each control is represented in a command bar by a text string 340 (FIG. 3), or an icon 345 (FIG. 3), or both.

In an exemplary embodiment, there are three types of icons: Office icons, Application icons, and Custom icons. The term Office icons refers to the set of read-only icons that are used throughout the "MICROSOFT OFFICE" suite of application programs. These icons are stored centrally as a resource in the dynamic-link library in order to reduce memory requirements. Preferably, all command bar-related icons would be included in this category. Each icon has an identification number, which is fixed by the publisher of the software. Those skilled in the art will appreciate that, preferably, stand alone application programs that are command bar-enabled will include the dynamic-link library and the complete set of Office icons. This will ensure that no more than one copy of the Office shared code will ever need to be stored on the user's bard drive.

Application icons are primarily intended for use by "MICROSOFT OFFICE"-compatible applications. The identification numbers for application icons are within a special range reserved for use by the applications. This type of icon can be used by revised "OFFICE" applications without requiring that the dynamic-link library be updated. In an exemplary embodiment, application icons cannot be used with menu merging, which is discussed below.

Custom icons are drawn by a user and are stored with other command bar customizations in an application specific area. Each application is responsible for making sure custom icons are saved somewhere. However, the Office shared code provides an API (application programming interface) to perform the actual saving of the data.

Menu popups typically include text strings. These text strings are also stored in the dynamic-link library in order to further reduce the amount of memory required to store command bar-related data. The dynamic-link library stores the default mnemonic for use with each text string (e.g., File, Edit, View, etc.; See FIG. 3). However, the application can override the default text string and provide a string with a different mnemonic if the default creates a conflict with other controls. The same text strings that are used to describe a menu item when in menu format are displayed as "tooltips" when the mouse hovers over a button in a toolbar-lime command bar.

Every command bar and control has an identification number associated with it. Like icons, identification numbers fall into three categories: Office, Application, and Custom. Office IDs are set by the software publisher and are the same for every command bar-enabled program. Application IDs are set by an application and are only meaningful within an application. Application IDs are stored in a range of memory that is reserved for the application. Those skilled in the art will appreciate that menu merging, which is discussed below, relies on identification numbers, names, other means to determine whether command bars and controls in different application are identical.

As indicated above, an application may simultaneously display a plurality of command bars. However, in an exemplary embodiment, each application designates one toolbar-like command bar as its "main menu bar." Within each application, only one command bar at a time may be designated as the main menu bar. The main menu bar should be marked as non-hidable, in order to prevent the user from inadvertently ending up with all command bars being hidden. During menu merging between two applications, the main menu will come from merging each application program's main menu bar.

Replacing separate menu bars and toolbars with a single command bar data structure provides several important advantages over the prior art. First, using a single data structure to present both toolbar-like command bars and menu-like command bars allows any control to be included in any command bar. There are no longer distinctions that limit which type of controls go on which type of container. In addition, the use of a single command bar data structure for all command bars makes it possible to employ a single customization procedure to customize command bars regardless of the form in which they are displayed. This is advantageous from the user's perspective because it simplifies the customization process. This is also advantageous from the programmer's perspective because it reduces two different processes to one. In addition, a program only needs a single way to go from a selected control to the proper command, and a single mechanism for displaying whether commands are currently disabled.

These advantages are achieved because the application and dynamic-link library employ a single code base to manage all command bars. The application and dynamic-link library maintain a single list of commands, which reduces the size of the code and its redundancy.

Internally, controls are added to a command bar by storing the identification numbers of the controls that are included in that command bar. By managing the command bar data structure in this manner, it is as easy for the program to add one type of control as it is to add any other. As a result, menu-type command bars can includes text boxes, color pickers, and other controls that were formerly restricted to toolbars.

Figure 5:
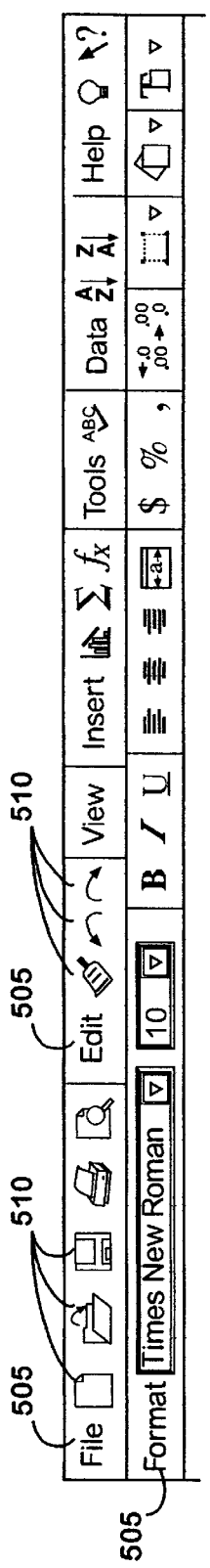
FIG. 5 illustrates a docked command bar in which menu controls are positioned with pushbutton controls.
Figure 6:
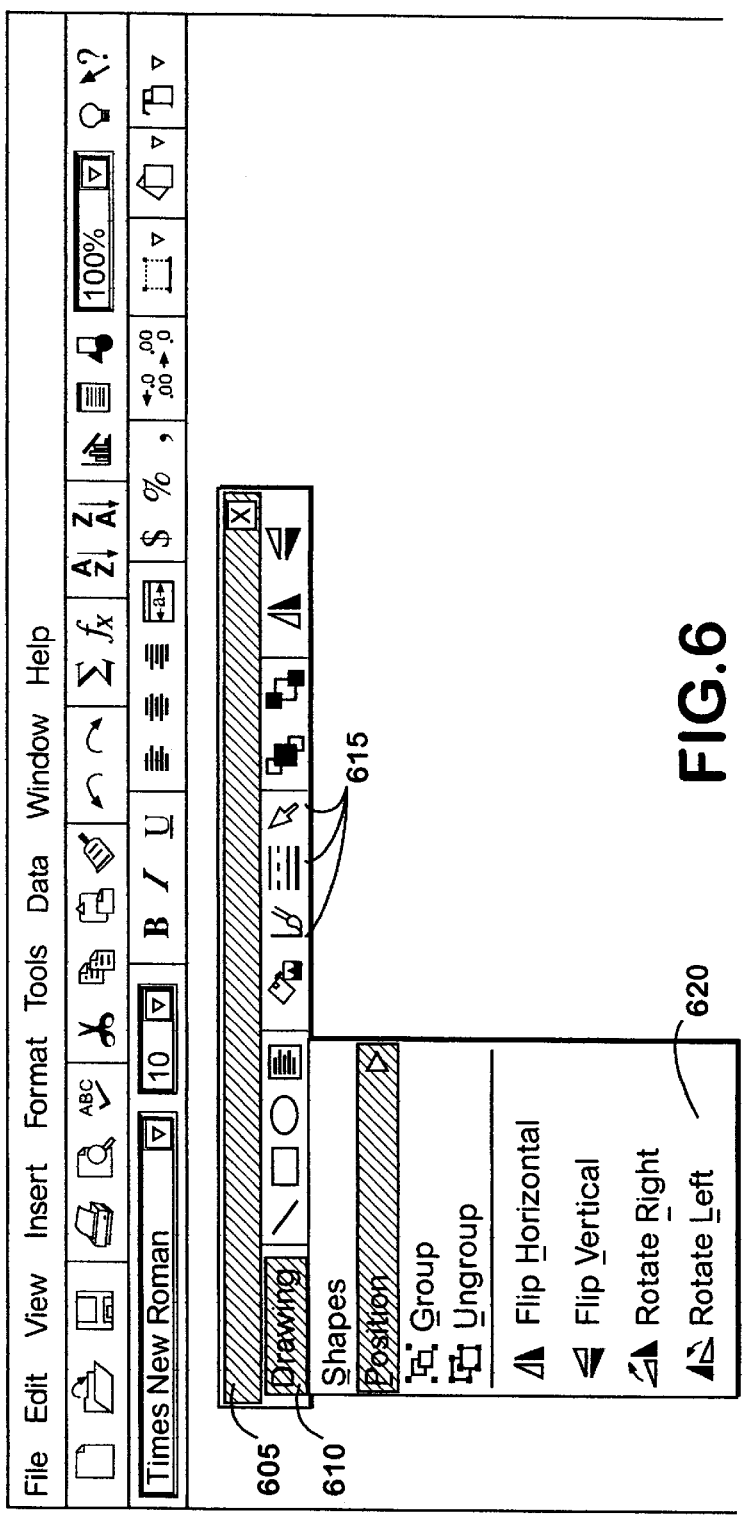
FIG. 6 illustrates a floating command bar in which a menu control is positioned next to pushbutton controls.

FIGS. 5 and 6 illustrate how the versatility of command bars allows controls to be grouped together in very advantageous ways. FIG. 5 illustrates toolbar-like command bars in which menu controls 505 are positioned alongside pushbutton controls 510. It will be appreciated that the controls that are illustrated in FIG. 5 are virtually identical to the controls that are illustrated in FIG. 2, which was discussed earlier. Similarly, it will be appreciated that selecting the menu controls 505 (e.g., "FILE," "DRAWING," etc.) results in the display of a menu popup (e.g., menu popup 330 (FIG. 3)).

Rearranging the controls in the manner illustrated in FIG. 5 provides several advantages. First, it allows a user to conserve vertical screen space. In this example, three command bars (as illustrated in FIG. 2) have been reduced to two. In addition, by grouping a menu control 505 with related pushbutton controls, it is easier for a user to learn the meaning of the pushbutton controls. In FIG. 5, the "FILF" menu control is located next to file-related pushbutton controls. This makes it easier for the user to relate to and remember the functions of the pushbutton controls. This versatility also makes it easier to implement component software, because a component can contribute a single group of controls, which may include menu controls and pushbutton controls, instead of scattering its UI controls over conventional menu bars and toolbars.

FIG. 6 illustrates additional advantages of being able to combine various types of controls on a command bar. FIG. 6 depicts a floating command bar 605. The command bar 605 includes a "DRAWING" menu control 610 and several drawing-related pushbutton controls 615. When the menu control 610 is activated, it results in the display of a menu popup 620, which includes a variety of pushbutton controls. By arranging command bars in this manner, the user is able to place frequently used pushbutton controls on the command bar 605, where they are readily accessible. The user is also able to locate other drawing related controls, such as more advanced, but less frequently used advanced drawing features, on the menu popup 620. This allows all of the desired drawing-related controls to be grouped together in a command bar, with the most frequently used controls being most accessible to the user. The menu control 610 on the command bar 605 also serves the additional purpose of acting as a label for the floating command bar. In a typical use, a command bar may include at its top level a single menu control and shortcuts (or pushbuttons) for items on that menu. Those skilled in the art will appreciate that this type of arrangement is not possible under the data structures associated with conventional menu bars and toolbars.

Figure 7:
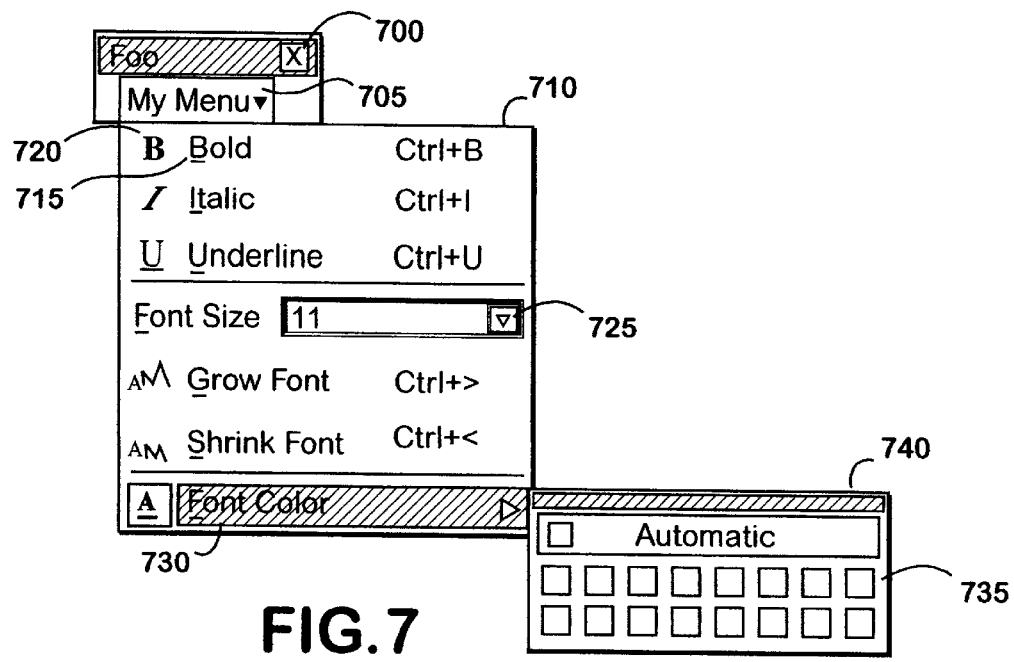
FIG. 7 illustrates the inclusion of a variety of control types in a menu popup.

FIG. 7 illustrates how command bars allow any type of control to be included in a menu popup. In this example, a floating command bar 700 includes a single menu control 705. When the menu control 705 is activated, a menu popup 710 is displayed. In this example, the menu popup 710 includes text strings 715, which were the only items included in conventional pull down menus. In command bars, the menu popup 710 also includes icons 720 that correspond to text strings 715, combo boxes 725, and a color picker 730.

Those skilled in the art will appreciate that this ability to include any type of control in any command bar, regardless of its display state, provides significant advantages over the prior art method of grouping controls in menu bars and toolbars. For example, the ability to include text boxes, combo boxes, and the like in a menu popup, eliminates the need to use separate dialogs in many cases. For example, in conventional menu bars, the selection of a command that required additional input from the user resulted in a dialog being displayed so the user could enter the required data. With command bars, the menu popup may include a text box or other control that allows the user to enter the required input directly in the menu popup.

In summary, the ability to include all types of controls in all types of command bars is extremely advantageous, and is a result of the underlying command bar data structure. This results in controls being included in menu popups instead of requiring them to be in the top level of a toolbar-type structure. This also avoids the use of dialogs in many cases.

COMMAND BAR CUSTOMIZATION

Command bars may be customized more easily than conventional menu bars and toolbars. Generally described, a user may customize command bars by dragging a control from a list of available commands to the desired position in a command bar. This process is employed regardless of whether the desired position is in a toolbar-like command bar or in a menu-like command bar. In addition, when the customize mode is selected, the user may move or copy a control from one command bar to another. This is possible because the application and dynamic-link library have a single list of commands that may be represented by controls in any type of command bar. In addition, the icons, text strings, and associated data are stored only once regardless of the number of applications that use the control.

Figure 8:
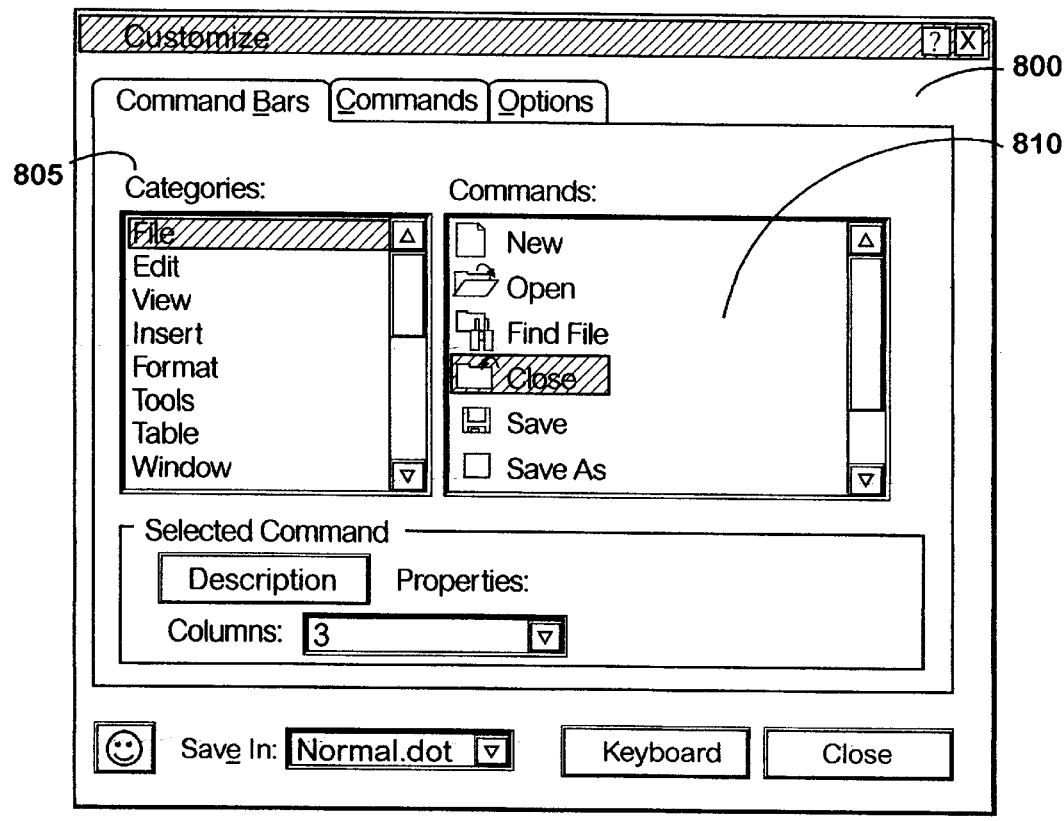
FIG. 8 illustrates a dialog that is used in the command bar customization process.

FIG. 8 illustrates a dialog 800 that is employed in the process of customizing command bars. This dialog appears when the user enters the customize mode. The dialog 800 provides a list of categories 805. When the user selects a category, the corresponding commands are displayed in the command section 810 of the dialog. At this point, the user may drag any of the controls in the command section 810 on to any of the displayed command bars. When the user is dragging a control, a highlight appears in order to indicate where the control will be located once it is dropped. If a control is dropped on a menu popup, it will be displayed with both a text string and icon, where applicable. As mentioned above, the user may also move or copy controls from one command bar to another. The dialog also provides commands that allow the user to create new command bars. A user may delete controls from a command bar by dragging them off of a command bar.

If the user moves a control over a menu control, the corresponding menu popup will appear in order to allow the new control to be positioned on it. If the user drops a control in a menu popup, it stays popped up so the user can see the result. If a menu popup pops up during the customization process, it will be closed when the user clicks the menu's parent menu control, when the user selects a control not inside that menu, when the user drags over another customizable bar, or when the user ends customize mode. If a user has just moused down on a menu control, the menu will drop. If the user immediately starts dragging the menu control, the popup closes in order to prevent the user from dragging the menu control inside its own menu popup.

COMMAND BAR MERGING

As mentioned above, Microsoft Corporation's OLE interface allows documents of one type to be embedded in documents of another type. For example, a spreadsheet may be embedded in a word processing document. Under OLE, the embedded spreadsheet object may be activated and edited from the word processing window. In order to accomplish this task, OLE provides merged menus that provide commands from both the container (e.g., the word processor) and the server or object (e.g., the spreadsheet).

An exemplary embodiment of the command bar architecture provides substantial advantages over prior art menu merging techniques. With command bars, application programs are no longer required to donate entire menus. Instead, an application may donate individual commands to the merged menus. These merged commands are organized in a way that is intuitive and user-friendly. In addition, merging between toolbar-like command bars is supported so that each button will be functional and will carry out the expected response. This results in merged menus and toolbars that provide enhanced functionality, while also being user friendly.

Menu merging raises two issues: (1) what commands are merged; and (2) where do the merged items go. With two command bar-enabled applications, each application donates individual commands to the merged set. The donated commands include only those commands that the application program can support in its merged state. In addition, since command bars do not distinguish between menu bars and toolbars, all types of command bars are merged in the same manner. As applications are divided into smaller and smaller components, this allows their commands to be merged into a coherent set.

Figure 9:
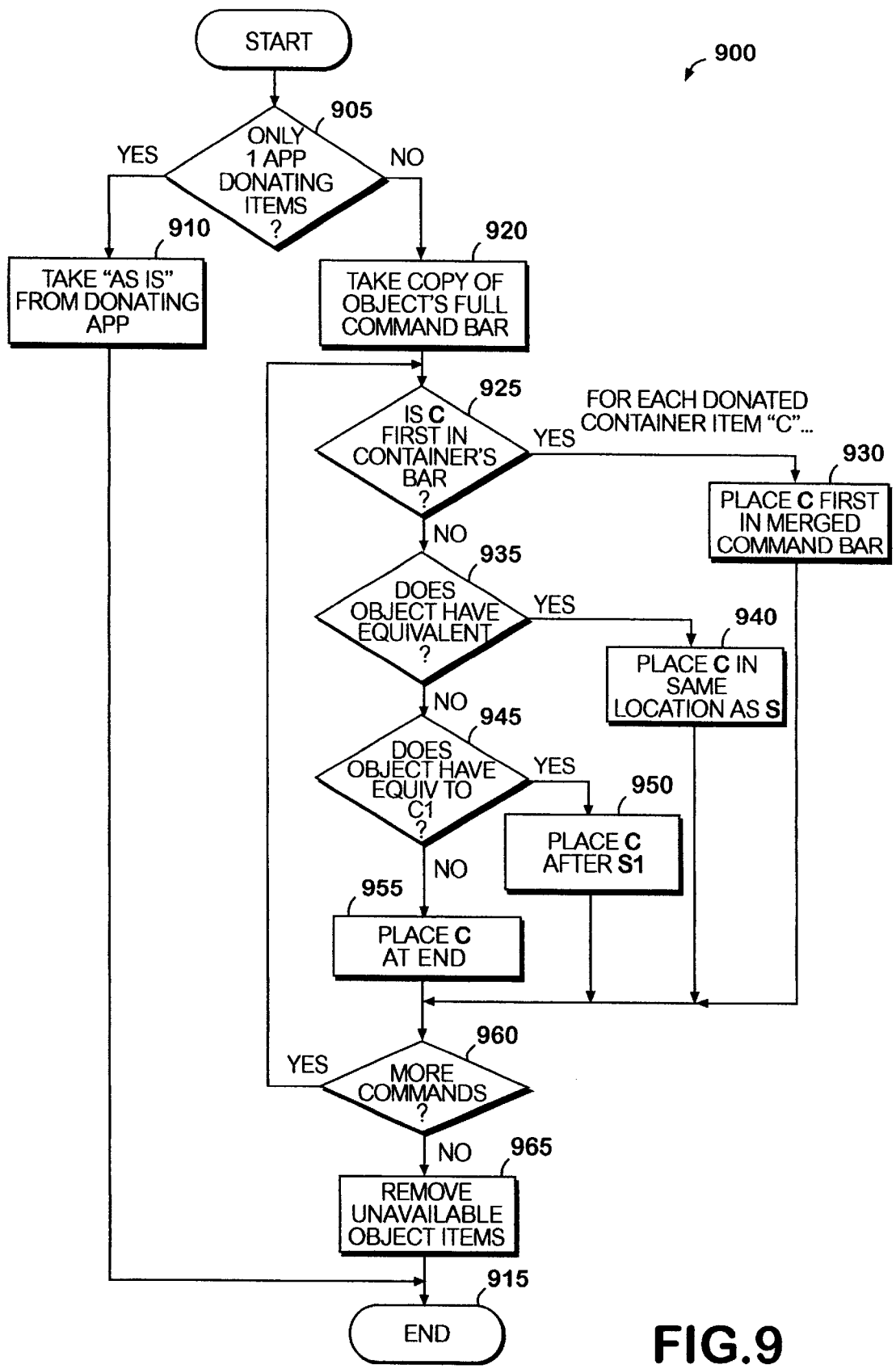
FIG. 9 is a flow diagram illustrating an exemplary method for merging command bars.
Figure 11:
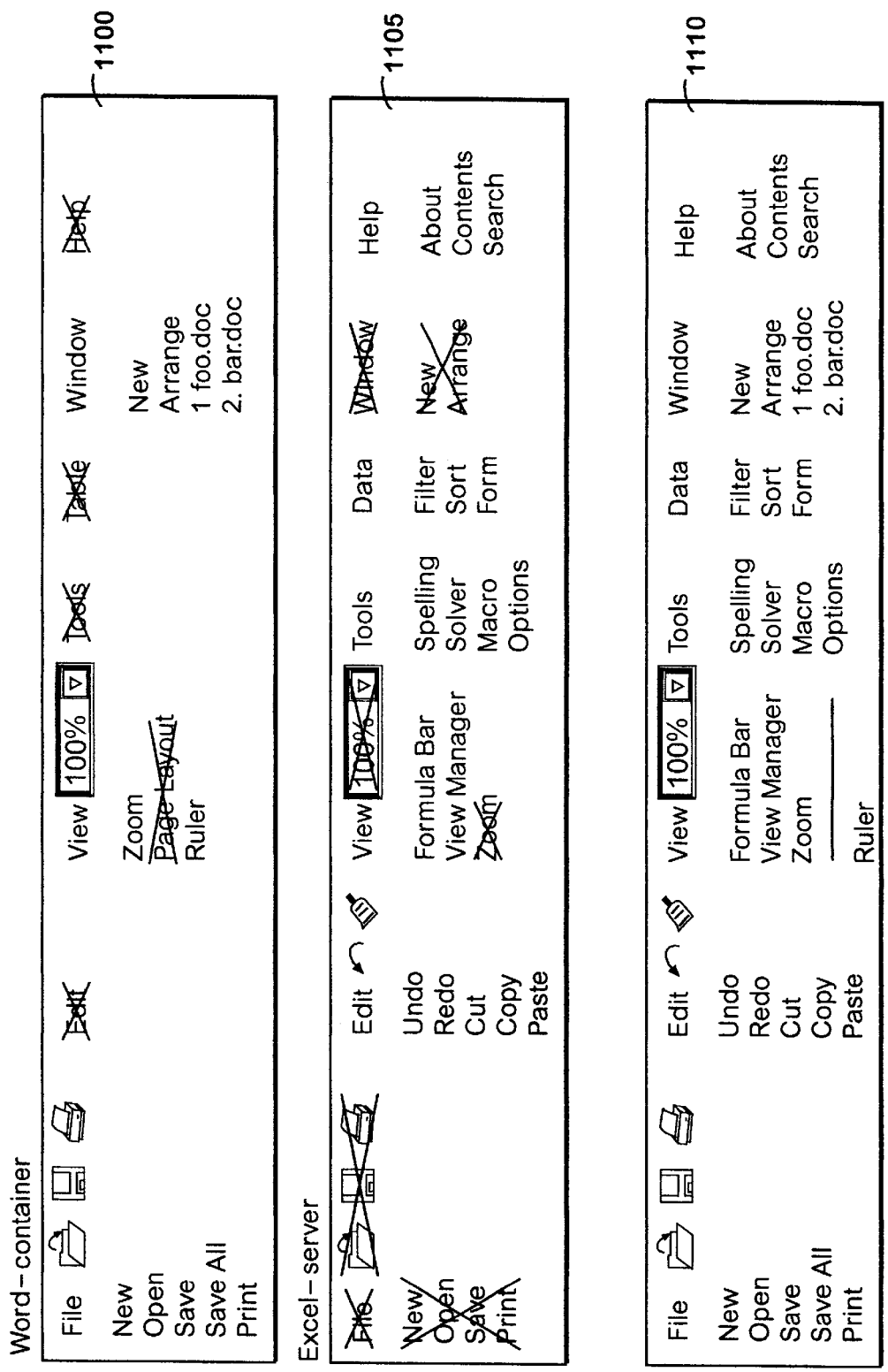
FIG. 11 is an example of how two command bars may be merged.

FIGS. 9–11 illustrate an exemplary method for merging command bars. FIG. 9 is a flow diagram illustrating an exemplary method 900 for merging command bars. FIGS. 10 and 11 illustrate examples of how the method of FIG. 9 may be applied. The inter-application communication and negotiation is carried out by the Office shared code.

Turning now to FIG. 9, an exemplary method of merging commands will be described. Those skilled in the art will appreciate that menu merging occurs when an embedded object is activated. The method of FIG. 9 is applied to each command bar. Each application includes flags that indicate which commands it will donate. The flags indicate if a command will be donated when the application is acting as a container or as a server (i.e., the embedded object). As a result, some commands may not be considered for merging depending on whether the application is acting as container or server. When merging command bars and individual commands, the Office shared code must determine whether command bars and commands are identical. In an exemplary environment, this is accomplished by comparing the identification numbers that are used to identify each command bar and commands. Thus, two command bars are "equivalent" and should be merged if they have the same OLE group ID.

The method 900 begins at step 905 as the Office shared code begins the process of merging a command bar. At step 905 the process determines if the command bar (as identified by its OLE group ID) appears in only one of the application programs. If so, the method proceeds to step 910 and takes the command bar "as is" for inclusion in the merged command bar set. The controls that are not applicable to the program's status as client or server are removed from the command bar prior to display. From step 910, the method proceeds to step 915 and terminates.

If, at step 905, both application programs are donating commands to the command bar, the Office shared code must decide how to order the donated items in the resulting merged command bar. The first step in this process occurs at step 920, where the method begins with a copy of the server's full command bar (including the commands that will not be donated).

For each donated container item, C, the method performs several steps. If C was the first item in the container's command bar (step 925), then C is placed first in the merged command bar (step 930).

If the server application has an item S that is equivalent to the item C (step 935), the item C is placed in the same location as the item S (step 940).

If the server does not have an equivalent item, the method will look at the item in the container's command bar that precedes the item C, and determine whether the server's command bar contains an equivalent item (step 945). If so, the item C is placed in the position after the equivalent item in the server's command bar (step 950).

If none of preceding conditions is satisfied, the item C is placed at the end of the merged command bar (step 955). A separator is used to segregate the commands that are placed at the end of the merged command bar.

After the item C is placed in the merged command bar, the method proceeds to step 960 and determines whether the container application includes any additional commands that need to be merged. If so, the method returns to step 925. If not, the method returns to step 965 and removes any of the commands from the object application that are not supposed to be donated.

FIG. 10 illustrates an application of the method of FIG. 9. FIG. 10 depicts command bars from a container application and a server application (the object). The bold items represent commands that will be donated to the merged command bar.

At line 1000, the method starts with the object's command bar items. See FIG. 9, step 920.

At line 1005, because the item U is the first item in the container's command bar, it is positioned first in the merged command bar. See FIG. 9, step 930.

At line 1010, because the object's command bar contains an item that is equivalent to the item U, which precedes the item V, the item V is positioned after the item U. See FIG. 9, step 950.

At line 1015, because the item X from the container's command bar is equivalent to the item X in the object's command bar, the container's item X is placed in the merged command bar in the same position as the object's item X. See FIG. 9, step 940.

At line 1020, because container item Z is preceded by item Y, and because the object includes an item Y, the item Z is placed in the merged command bar after the item Y. See FIG. 9, step 950.

At line 1025, the method removes all of the commands that are not to be donated to the merged command bar. See FIG. 9, step 965.

It will be appreciated that although neither application donates the item Y to the final result in this example, keeping the item Y around until the last step allows item Z to be placed in a natural position. This aspect of the process allows the final result to be closer to the user's expectation.

FIG. 11 is another example of an exemplary method for merging command bars. FIG. 11 includes a container application's command bar 1100, a server application's command bar 1105, and the merged command bar 1110 that results from applying the method of FIG. 9 to the commands.

From the foregoing description and examples, it will be appreciated that command bars provide improved menu merging capabilities, as indicated by the preceding examples. Command bar merging allows container-related and object-related commands to come from appropriate sources and to operate properly when selected. The resulting command bar has commands from both applications. When a command is selected from the merged command bar, the Office shared code routes the instructions to the proper application.

TEARING OFF MENU POPUPS

FIG. 7 illustrates a method for "tearing off" menu popups and displaying them as floating command bars. Each menu popup 735 that can be torn off includes a drag handle 740. The drag handle resembles the title bar that is used to drag most application windows. The drag handle provides a distinguishing visual cue for tear-off menus and also provides a cue on how the menu can be torn off.

In an exemplary embodiment, a user has two ways to tear off a tearable menu popup. In a first method, the user can click on a menu control and cause the menu popup to be displayed, as in FIG. 7. The user may then click on the drag handle 740 and drag the menu popup. This results in the menu popup being torn off and converted into a floating command bar. This process is similar to how window are normally dragged in various GUI operating systems.

Those skilled in the art will understand that the "removed" menu popup may be a duplicate, and that the original menu popup may still be available in its original location. It will be appreciated that the "removed" menu popup may be displayed as a floating toolbar-type command bar or as some alternate representation. In other words, the removed menu popup need not look exactly like the original menu popup. In addition, the removed menu popup and the original menu popup need not contain identical controls.

In a second method, the user may keep the mouse button pressed down after displaying the menu popup, and then move the cursor over the drag handle 740 and release the mouse button. This will result in the menu popup being torn off and placed in a default position.

Addition features can be added to enhance the discoverability and operation of the feature. For example, the drag handle may change colors when the cursor is positioned over it. This would indicate to the user that the drag handle is an active control and not just decoration. In addition, when the cursor is moved over the drag handle, a tip may appear explaining how to tear off the menu popup.

As yet an additional feature, when the user tears off a menu popup using the first method, the user can cancel the tearing off operation by dragging the floating command bar back to its initial position. This will cause the floating command bar to snap back into menu popup form if the user comes within a certain distance of the original position.

Those skilled in the art will appreciate that tear off menu popups might have been dropped down directly from a top level menu control on a command bar, or might be one or more layers deep in cascade form. Once the menu popup is torn off, it becomes a separate, floating command bar, which can be separately positioned and customized.

SUMMARY OF THE DETAILED DESCRIPTION

From the foregoing description, it will be appreciated that the present invention provides an improved system and method for displaying controls in a GUI system. In an exemplary system, the invention provides a versatile command bar data structure that may be used to display various types of controls in a variety of configurations. By relying on a single data structure, command bars provide a variety of advantages, including a unified customization procedure, the ability to includes any control type in any command bar, and simplified underlying code. In addition, command bars provide improved command merging and a novel way to tear off menu popups and convert them to floating command bars.

The invention may conveniently be implemented in one or more program modules that are based upon and implement the features illustrated in FIGS. 2–11. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be-applicable to all of these many different systems. Each user of a particular computer will be aware of the language and tools which are most useful for that user's needs and purposes.

Although the invention was described in the context of one or more application programs using a dynamic-link library to implement command bar code, including methods for merging command bars, those skilled in the art will appreciate that the invention is applicable to other applications and methods. Similarly, the invention may be applied regardless of whether the GUI elements are implemented in program modules associated with an operating system or application program.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for merging a first set of controls from a first command bar in a first program module and a second set of controls from a second command bar in a second program module, said method comprising the steps of:

determining which of the first set of controls are eligible to be donated;

determining which of the second set of controls are eligible to be donated;

combining the eligible controls from the first set of controls with the eligible controls from the second set of controls ; and displaying a merged command bar including at least one control from the first set of controls and at least one control from the second set of controls.

2. The method of claim 1, wherein combining the eligible controls from the first set of controls with the eligible controls from the second set of controls comprises the steps of:

comparing the eligible controls from the first set of controls to the second set of controls; and arranging the eligible controls from the first set of controls in the merged command bar.

3. The method of claim 2, wherein the steps of comparing and arranging the eligible control from the first set of controls comprise the steps of:

determining whether the eligible control from the first set of controls is equivalent to a control from the second set of controls; and if the eligible control from the first set of controls is equivalent to a control from the second set of controls, placing the eligible control from the first set of controls in the same position as the equivalent control from the second set of controls.

4. The method of claim 2, wherein the steps of comparing and arranging the eligible controls from the first set of controls comprise the steps of:

determining whether the control that precedes the eligible control from the first set of controls in the first command bar is equivalent to a control from the second set of controls; and if the control that precedes the eligible control from the first set of controls in the first command bar is equivalent to a control from the second set of controls, placing the eligible control from the first set of controls after the equivalent control from the second set of controls.

5. The method of claim 2, wherein the steps of comparing and arranging the eligible controls from the first set of controls comprise the steps of:

determining whether an eligible control from the first set of controls is first in the first command bar; and if the eligible control is first in the first command bar, placing the eligible control first in the merged command bar.

6. The method of claim 1, further comprising the steps of:

determining whether the first command bar and the second command bar are equivalent; and if the first command bar and the second command bar are not equivalent, displaying the first command bar including the controls from the first set of controls.

* * * * *